J. S. GORDON & S. P. MUMMA.
TEA AND COFFEE PERCOLATOR.
APPLICATION FILED JUNE 16, 1908.
909,178.
Patented Jan. 12, 1909.
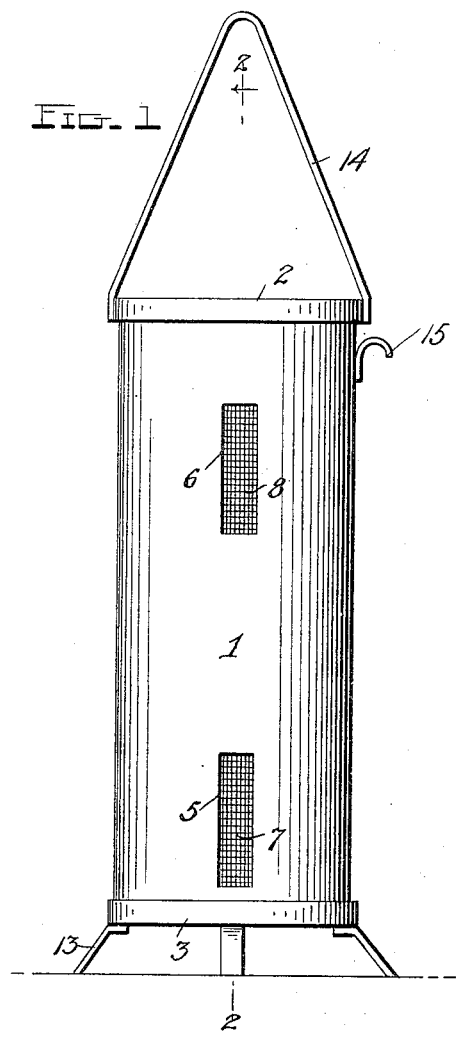
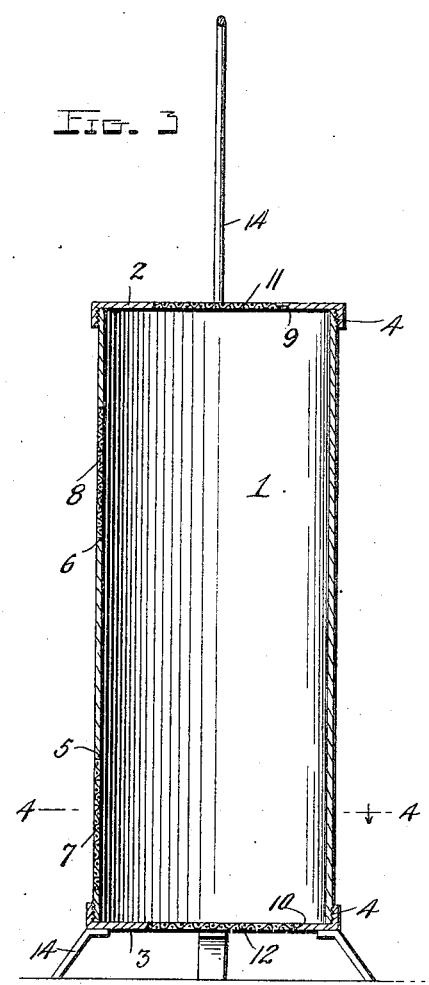
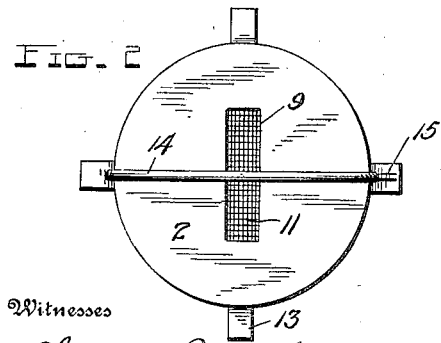
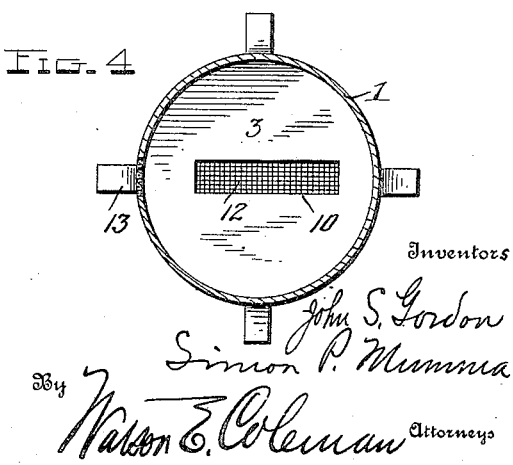
Witnesses
Chas. L. Griesbauer
M. L. Skinner
Inventors
John S. Gordon
Simon P. Mumma
By Watson E. Coleman
Attorneys

UNITED STATES PATENT OFFICE.

JOHN S. GORDON AND SIMON P. MUMMA, OF CANAL DOVER, OHIO.

TEA AND COFFEE PERCOLATOR.

No. 909,178.     Specification of Letters Patent.     Patented Jan. 12, 1909.

Application filed June 16, 1908. Serial No. 438,879.

*To all whom it may concern:*

Be it known that we, JOHN S. GORDON and SIMON P. MUMMA, citizens of the United States, residing at Canal Dover, in the county of Tuscarawas and State of Ohio, have invented certain new and useful Improvements in Tea and Coffee Percolators, of which the following is a specification, reference being had to the accompanying drawings.

This invention relates to improvements in percolators or strainers for coffee and tea.

The object of the invention is to provide a simple and practical device of this character which may be conveniently handled and which may be adapted for use in making either large or small quantities of tea or coffee.

With the above and other objects in view, the invention consists of the novel features of construction and the combination and arrangement of parts hereinafter fully described and claimed, and illustrated in the accompanying drawings, in which—

Figure 1 is a side elevation of the improved tea or coffee percolator; Fig. 2 is a top plan view; Fig. 3 is a vertical section through the same; and Fig. 4 is a horizontal section.

The invention comprises a cylindrical body 1 having open ends closed by removable heads 2, 3, the former of which is adapted to serve as the top and the latter of which as the bottom. These heads 2, 3 have a screw threaded engagement with the ends of the body 1, as shown at 4, in order that said body may be reversed. Said body is formed adjacent to its opposite ends with two vertically extending openings 5, 6 which are covered by fine mesh wire gauze 7, 8 and in the top and bottom or heads 2, 3 are formed similar openings 9, 10 which are also covered by fine mesh wire and gauze 11, 12. Said openings and the straining fabric or gauze covering them permit of the free circulation of liquid through the body. The bottom head 3 is provided with supporting legs 13 which serve to space the same from the bottom of the coffee or tea pot in which the device is placed; and the top head 2 is provided with a substantially V-shaped bail handle 14 to permit the percolator to be conveniently handled.

A hook 15 is preferably provided on one side of the body 1 so that it may be suspended from the edge of the pot or other support to drain its contents. The body 1 is made reversible as above mentioned and the opening 5 in it is placed nearer to one end than the opening 6 is to the other end so that when a small quantity of tea or coffee is to be made the bottom 3 may be applied to the end of the body nearest the opening 5 and when a larger quantity is to be made the body may be reversed and the bottom 3 applied to its opposite end, as will be readily understood.

In use, the cover or top 2 is removed and the tea or ground coffee is placed in the body 1. The cover 2 is then applied and the device placed in a tea or coffee pot or other receptacle in which the tea or coffee is to be made. After the tea or coffee has been made the device may be drained by suspending it from the edge of the pot by means of the hook 15 and after its contents has drained it may be removed from the pot by means of the handle 14 and readily emptied and cleaned by removing its two heads or ends 2, 3.

Having thus described the invention what is claimed is:

A tea or coffee percolator comprising a body formed with openings covered by straining material, one opening being arranged closer to one end than the other opening is to the opposite end and removable and interchangeable heads upon the ends of said body, whereby the latter may be reversed and one of its ends used as a bottom when a small quantity of tea or coffee is to be made and its other end used when a large quantity of the same is to be made, said heads having openings covered by straining material substantially as specified.

In testimony whereof we hereunto affix our signatures in the presence of two witnesses.

JOHN S. GORDON.
SIMON P. MUMMA.

Witnesses:
C. B. RICHEY,
C. BOYD.